Patented Dec. 1, 1925.

1,563,346

UNITED STATES PATENT OFFICE.

CHARLES RAYMOND DOWNS, OF NEW HAVEN, CONNECTICUT.

COMPOSITION OF STYPTICS.

No Drawing. Application filed August 12, 1924. Serial No. 731,636.

*To all whom it may concern:*

Be it known that I, CHARLES RAYMOND DOWNS, a citizen of the United States, and residing at 813 Quinnipiac Avenue, in the city of New Haven, county of New Haven, and State of Connecticut, have invented certain new and useful Improvements in the Composition of Styptics, of which the following is a specification.

This invention relates to improvements in the composition of styptics. Many materials have been proposed or used in the past as hæmostatic or styptic agents. Such include perchloride and sulphate of iron, tannic acid, collodion, alum, adrenalin and others. I have found that phthalyl peroxide is a very valuable and efficient styptic and possesses a combination of properties which make it more desirable than the styptics heretofore known.

Phthalyl peroxide is a solid which may be prepared in powdered form; is stable if maintained in a dry condition by the exercise of ordinary care; liberates oxygen when moistened and forms in addition phthalic acid. When applied to a bleeding cut or raw surface, oxygen is liberated which coagulates the blood and forms a clot producing hæmostasis. This action is moreover apparently assisted by the fact that phthalic acid is also formed which exerts an astringent action. The cut moreover is sterilized by the liberation of oxygen and the products formed are non-toxic. Another advantage of this material when used as a styptic is that phthalic acid, a product of this process of hæmostasis, is relatively insoluble and the clot is not easily removed. In fact, the clot may be wetted with water shortly after its formation without dislodging it. The formation of an adherent clot is assisted by the addition of various fillers to the phthalyl peroxide.

Although phthalyl peroxide can be used alone, its action is so rapid that this is not necessary and it may be diluted by means of various fillers such as talc, clay, asbestine and the like to lower its cost. Moreover, the phthalyl peroxide may be mixed with phthalic acid with which it is often associated as a result of its manufacture. The addition of a stable diluting agent such as a filler or phthalic acid is furthermore desirable as the danger of a sudden undesired decomposition of the peroxide is reduced to a negligible quantity thereby.

Coloring matters and perfumes may be added to the styptic mixture without departing from the spirit and scope of the invention.

The invention will be described more clearly by the following specific example, illustrative thereof, but it is understood that I do not limit myself to the details of this example. The following composition has been found to be particularly useful in stopping the flow of blood from small cuts such as may be produced during shaving. Equal parts of a powdered phthalyl peroxide, containing 40% of free phthalic acid, and powdered talc are thoroughly mixed together and preserved in a dry condition until used. The application of a very small amount of the powder to the cut is ordinarily sufficient to stop immediately persistent bleeding.

Having now described my invention, I claim:

1. A styptic mixture containing phthalyl peroxide.

2. A styptic mixture containing phthalyl peroxide and phthalic acid.

3. A styptic mixture containing phthalyl peroxide, phthalic acid and a filler.

4. A styptic mixture containing phthalyl peroxide, phthalic acid and powdered talc.

In testimony whereof, I hereby affix my signature.

CHARLES RAYMOND DOWNS.